(12) United States Patent
Kato et al.

(10) Patent No.: US 9,769,350 B1
(45) Date of Patent: Sep. 19, 2017

(54) INFORMATION PROCESSING APPARATUS

(71) Applicant: FUJI XEROX CO., LTD., Tokyo (JP)

(72) Inventors: Seishiro Kato, Yokohama (JP); Hideki Sato, Yokohama (JP); Tomitsugu Koseki, Yokohama (JP); Harunobu Miyashita, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/217,337

(22) Filed: Jul. 22, 2016

(30) Foreign Application Priority Data

Mar. 15, 2016 (JP) ................................. 2016-050960

(51) Int. Cl.
*H04N 1/00* (2006.01)
*H04N 1/32* (2006.01)
(52) U.S. Cl.
CPC ..... *H04N 1/32475* (2013.01); *H04N 1/00708* (2013.01); *H04N 1/00745* (2013.01); *H04N 2201/0094* (2013.01); *H04N 2201/329* (2013.01)
(58) Field of Classification Search
CPC ........... H04N 1/32475; H04N 1/00708; H04N 1/00745; H04N 2201/0094; H04N 2201/329
USPC ........................................................ 358/1.6
See application file for complete search history.

(56) References Cited

U.S. PATENT DOCUMENTS

| | | | | |
|---|---|---|---|---|
| 4,287,564 A | * | 9/1981 | Swift ................. | G06K 17/0016 355/86 |
| 5,162,918 A | * | 11/1992 | Muramatsu ........ | H04N 1/00352 358/300 |
| 6,281,990 B1 | * | 8/2001 | Takahashi ............ | H04N 1/1017 355/25 |
| 8,965,140 B1 | * | 2/2015 | Xu .......................... | G06K 9/38 382/195 |
| 2007/0177225 A1 | | 8/2007 | Morishita | |
| 2010/0118325 A1 | | 5/2010 | Kim et al. | |
| 2012/0049434 A1 | | 3/2012 | Nonaka | |
| 2015/0077817 A1 | * | 3/2015 | Shimazaki ............... | H04N 1/48 358/538 |

FOREIGN PATENT DOCUMENTS

EP     2 600 603 A2   6/2013
JP     2011-142521 A  7/2011

OTHER PUBLICATIONS

Mar. 14, 2017 Search Report issued in European Patent Application No. 16185214.0.

* cited by examiner

*Primary Examiner* — Allen H Nguyen
(74) *Attorney, Agent, or Firm* — Oliff PLC

(57) ABSTRACT

An information processing apparatus for transmitting image data input by sequentially reading documents, with limiting an allowable frame size, includes: a transmission controller, wherein, in a case where the document has an irregular size, the transmission controller transmits the image data to a transmission destination in a preset frame of a first frame size until a rear edge of the document is detected, and if a portion, which is not transmitted, of the image data exists when the rear edge of the document is detected, transmits the portion to the transmission destination in a frame of a second frame size smaller than the first frame size so that the transmitting of the portion is finished before a start of transmission of image data corresponding to a next document.

7 Claims, 5 Drawing Sheets

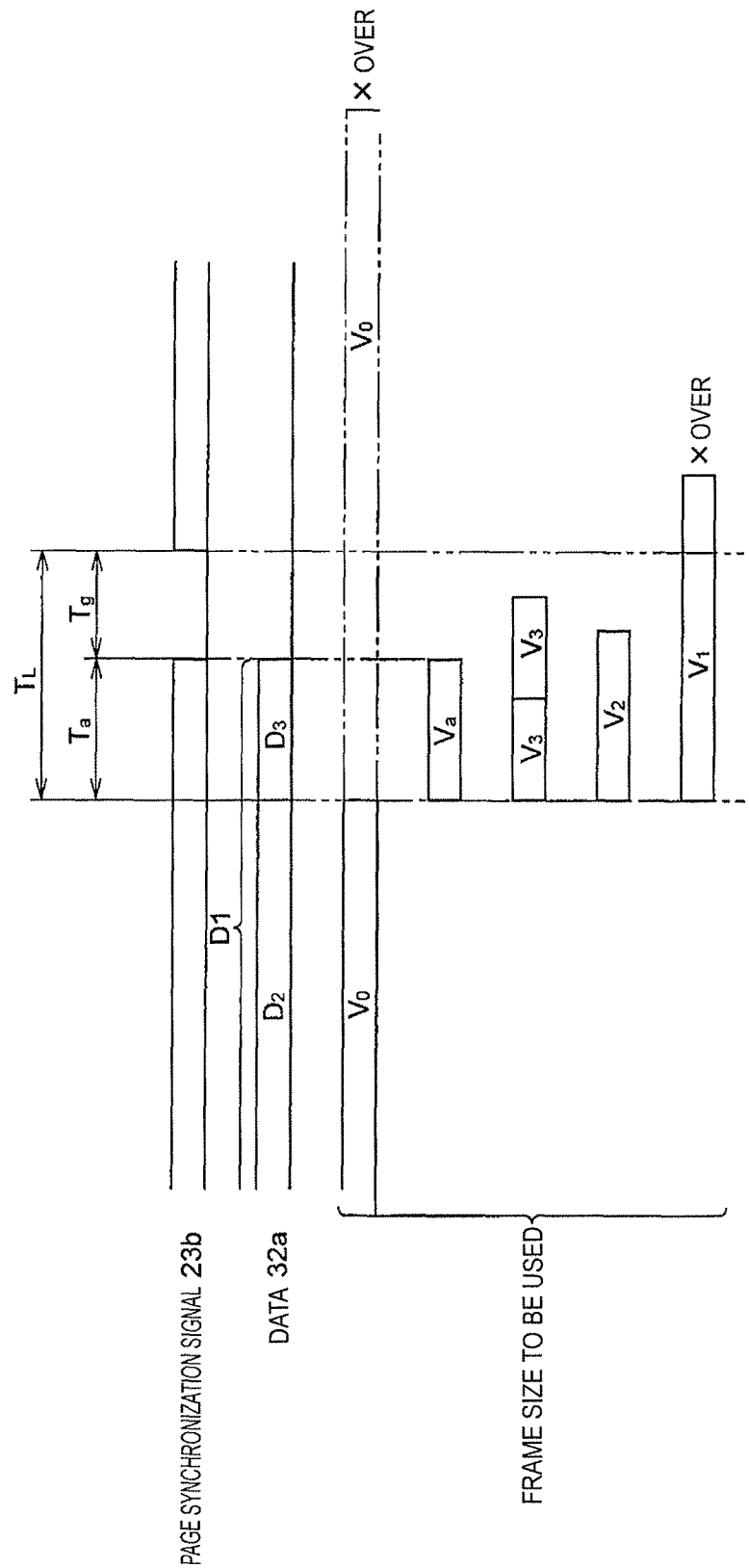

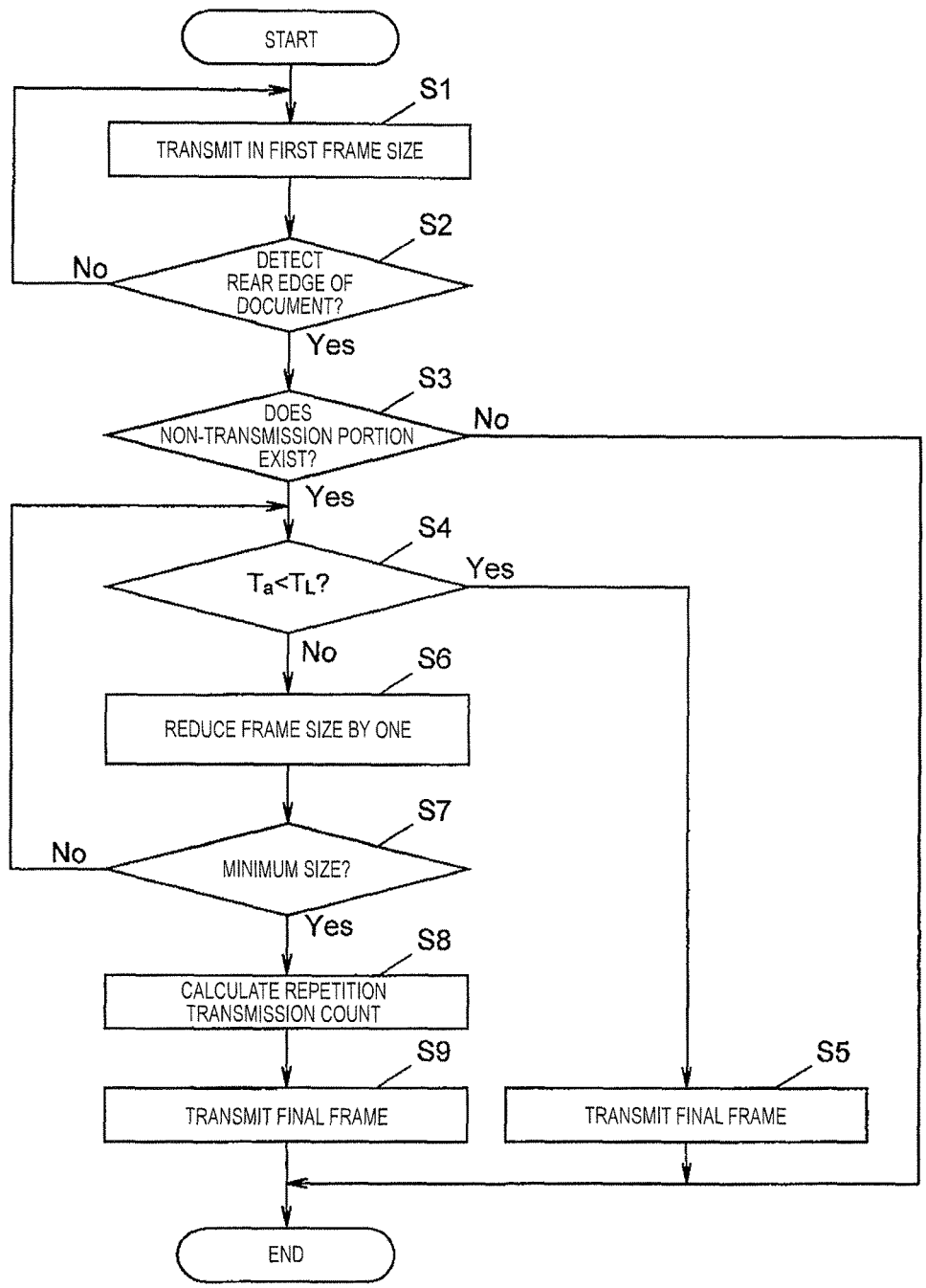

INFORMATION PROCESSING APPARATUS

CROSS-REFERENCE TO RELATED APPLICATIONS

This application is based on and claims priority under 35 USC 119 from Japanese Patent Application No. 2016-050960 filed on Mar. 15, 2016.

BACKGROUND

Technical Field

The present invention relates to an information processing apparatus.

SUMMARY

According to an aspect of the invention, there is provided an information processing apparatus for transmitting image data input by sequentially reading documents, with limiting an allowable frame size, the apparatus comprising: a transmission controller, wherein, in a case where the document has an irregular size, the transmission controller transmits the image data to a transmission destination in a preset frame of a first frame size until a rear edge of the document is detected, and when a portion, which is not transmitted, of the image data exists when the rear edge of the document is detected, transmits the portion to the transmission destination in at least one frame of a second frame size smaller than the first frame size so that the transmitting of the portion is finished before a start of transmission of image data corresponding to a next document.

BRIEF DESCRIPTION OF THE DRAWINGS

Exemplary embodiments of the invention will be described in detail based on the following, wherein:

FIG. 4 is a diagram illustrating an instance of a timing chart at the time of transmitting a final frame; and FIG. 5 is a flowchart illustrating an exemplary operation of a transmission controller when a document has an irregular size.

DETAILED DESCRIPTION

Figure 1:
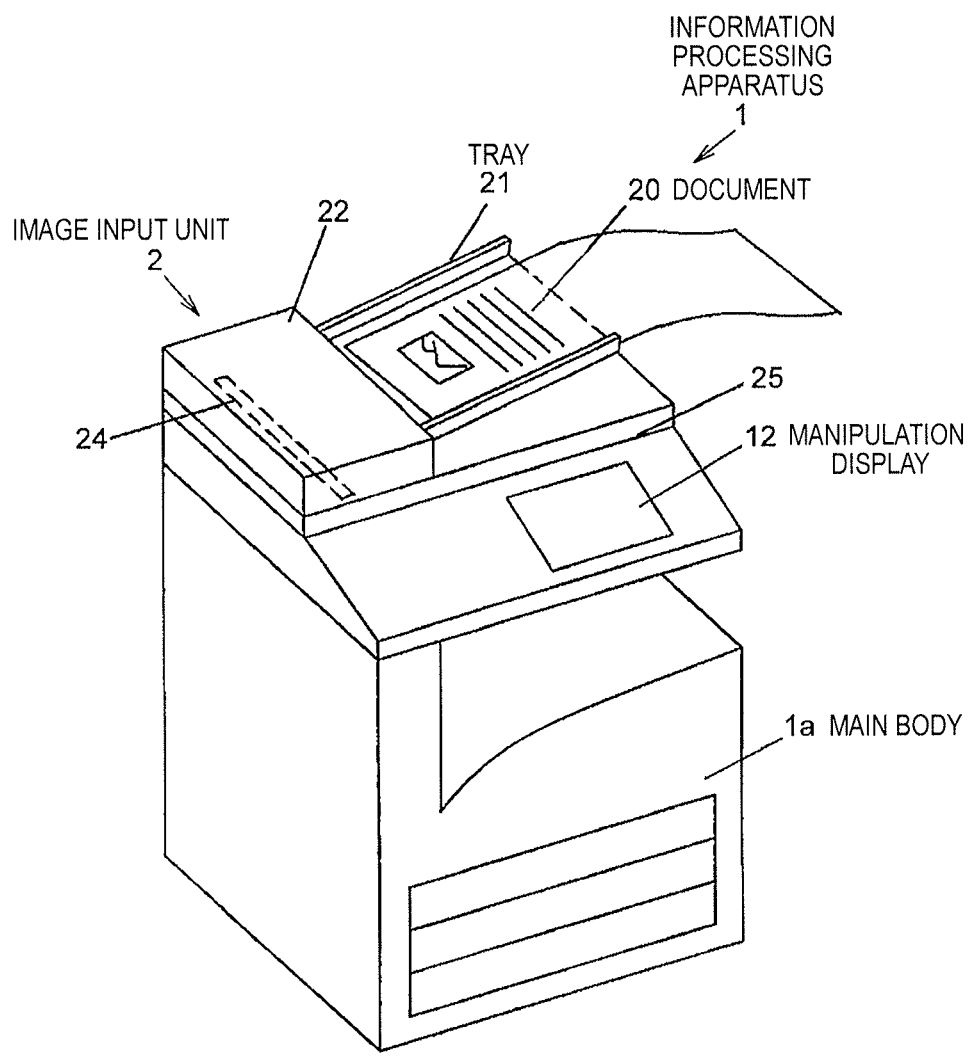
FIG. 1 is a perspective view illustrating an instance of appearance of an information processing apparatus according to an exemplary embodiment of the invention.

An exemplary embodiment of the invention will now be described with reference to the accompanying drawings. In each drawing, constituent elements having substantially the same function are given the same reference numerals and overlapping description will not be provided.

FIG. 1 is a perspective view illustrating an instance of appearance of an information processing apparatus according to an exemplary embodiment of the invention.

Figure 2:
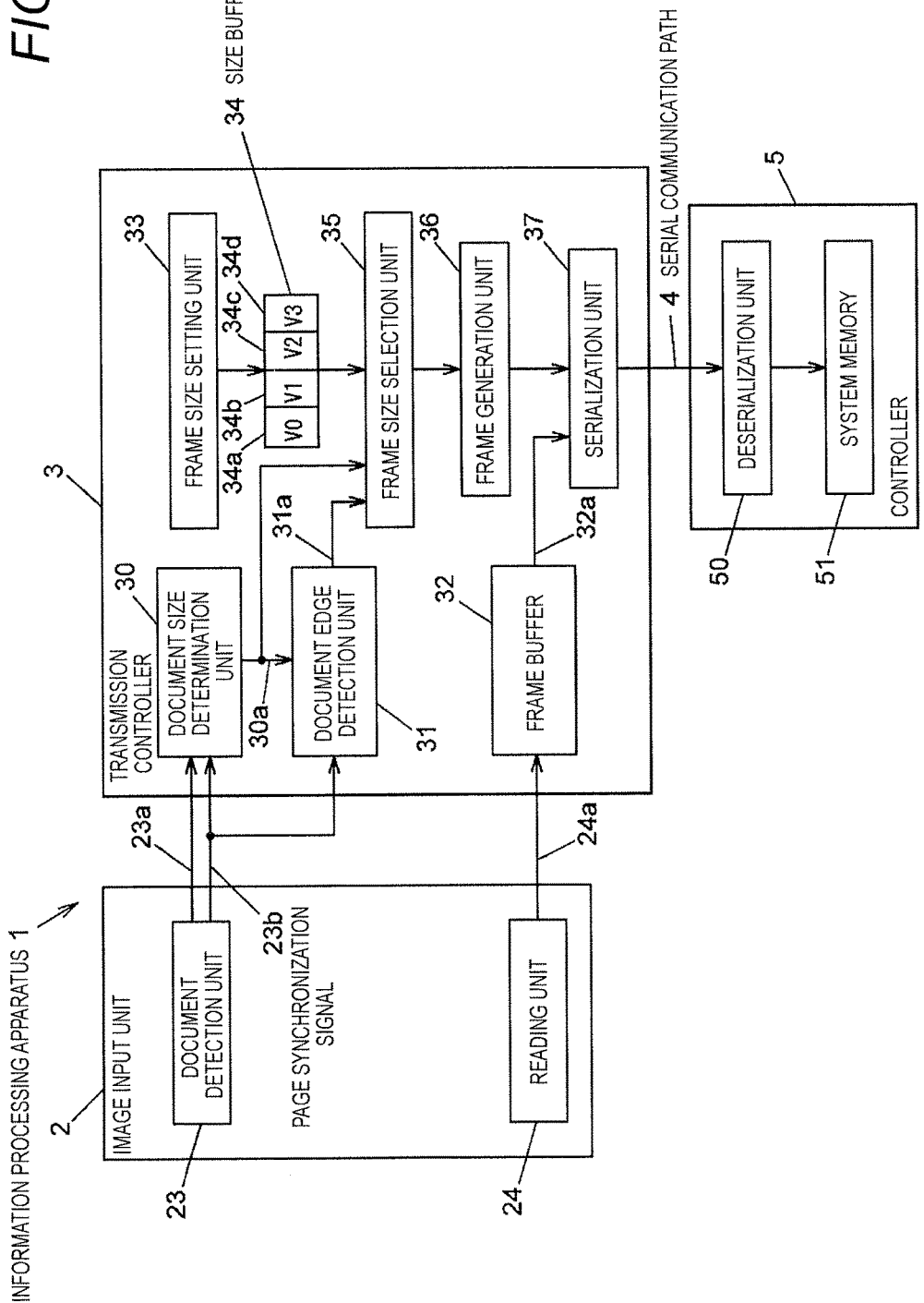
FIG. 2 is a block diagram illustrating an instance of a control system of the information processing apparatus according an exemplary embodiment of the invention.

The information processing apparatus 1 includes an automatic sheet feeding device 22 configured to automatically feed plural documents 20 placed in a tray 21 in a stack state one by one to a reading unit 24 and an image input unit 2 provided with a document platen 25 where the documents 20 are placed one by one. In addition, the information processing apparatus 1 is a multifunction device having various functionalities such as a printer, a copier, and a facsimile. The information processing apparatus 1 further includes a controller 5 provided with a central processing unit (CPU), a nonvolatile memory, and the like to process information of a main body 1a as illustrated in FIG. 2 and a transmission controller 3 configured to control transmission of image data input from the image input unit 2 to a controller 5 through a serial communication path 4 as illustrated in FIG. 2. Moreover, the information processing apparatus 1 has a manipulation display 12 such as a touch display for displaying a menu, various buttons, and the like and receiving manipulations therefrom. Here, the controller 5 is an instance of transmission destinations.

The documents 20 as a target object of the apparatus 1 may have a regular size, an irregular size, or a mix of a regular size and an irregular size. The "regular size" refers to a size of the document that conforms to the JIS standard such as an A-series (such as A3 or A4) or a B-series (such as B3 or B4), an American legal letter format, and the like. The "irregular size" has a size of a scanning direction that is shorter than a predetermined width (for example, a width determined by the tray 21) and is longer than the maximum length in a sub-scanning direction of the regular size.

FIG. 2 is a block diagram illustrating an instance of a control system of the information processing apparatus 1 according to an exemplary embodiment of the invention. The information processing apparatus 1 has an image input unit 2 configured to receive image data, a transmission controller 3 configured to transmit the image data input from the image input unit 2 to the controller 5 through the serial communication path 4, and a controller 5 configured to store the image data transmitted from the transmission controller 3.

The image input unit 2 has a document detection unit 23 configured to detect the document 20 supplied from the automatic sheet feeding device 22 and a reading unit 24 configured to optically read the image data on the document 20 supplied from the automatic sheet feeding device 22 or the document 20 laid on the document platen 25 using a solid image capturing element such as a charge-coupled device (CCD).

In the serial communication path 4, a serial interface such as the Mobile Industry Processor Interface (MIPI) is employed, in which the number of allowable frame sizes is limited to several frame sizes ("4" in this exemplary embodiment, that is, $V_0$, $V_1$, $V_2$, and $V_3$ in the order from the larger size). The largest frame size $V_0$ is referred to as a "first frame size", and other frame sizes $V_1$, $V_2$, and $V_3$ are referred to as a "second frame size". In the MIPI, an arbitrary frame size is not allowed, and it is necessary to select one of the four frame sizes prepared in advance. For instance, the frame size may include 720×480p, 1280×720p, 1920×1080p, 4096×2160p, 3840×2160p, and the like. In the MIPI, plural virtual channels may share a single communication path, and each of the virtual channels is provided with a buffer. In this exemplary embodiment, this buffer is used as a size buffer 34 for storing the frame sizes.

The controller 5 has a deserialization unit 50 configured to convert serial image data transmitted from the transmission controller 3 through the serial communication path 4 into parallel image data, and a nonvolatile system memory 51 configured to store the image data converted by the deserialization unit 50. The controller 5 transmits the image data stored in the system memory 51 to a printer engine, a hard disc, a user terminal, and the like depending on the selected menu.

The document detection unit 23 has plural document sensors arranged in plural portions in a main scanning direction to transmit a document detection signal 23a in the event of detection of the document 20, and an edge sensor configured to detect leading and trailing ends of the document 20 in a sub-scanning direction (feeding direction) and transmit a page synchronization signal 23b.

(Configuration of Transmission Controller)

The transmission controller 3 transmits image data input by sequentially reading plural documents 20 from the reading unit 24 to the controller 5 through the serial communication path 4. When the size of the document is an irregular size, the transmission controller 3 transmits the image data to the controller 5 in the frame of the predetermined first frame size $V_0$ until the rear edge of the document 20 is detected, and transmits a non-transmission portion (a portion which has not yet been transmitted) of the image data, if it exists at the time of the detection of the rear edge of the document 20, in one frame or in two or more frames of a second frame size $V_1$ to $V_3$ smaller than the first frame size $V_0$ to the controller 5 so that transmission of the non-transmission portion is finished before a start of transmission of image data corresponding to a next document 20.

The first frame size may be a relatively large frame size out of frame sizes that can be used for the serial communication path 4, and is not limited to the maximum frame size. For instance, without using the first frame size $V_0$, the frame size $V_1$ may be used as a "first frame size", and the frame size $V_2$ or $V_3$ may be used as a "second frame size". Four frame sizes are used, but the invention is not limited thereto. For instance, kinds of the second frame size are three in this exemplary embodiment, but may be two.

The transmission controller 3 includes a document size determination unit 30, a document edge detection unit 31, a frame buffer 32, a frame size setting unit 33, a size buffer 34, a frame size selection unit 35, a frame generation unit 36, and a serialization unit 37. The transmission controller 3 may be implemented, for instance, using an application specific integrated circuit (ASIC) or a field programmable gate array (FPGA). Here, the frame buffer 32 is an instance of a memory.

The document size determination unit 30 determines a size of the document and whether the document 20 has a regular or irregular size based on the document detection signal 23a from the document sensor of the document detection unit 23 and the page synchronization signal 23b from the edge sensor. That is, the document size determination unit 30 determines the size of the document 20 in the main scanning direction of the document 20 based on the document detection signal 23a, and the size of the document 20 in the sub-scanning direction based on the page synchronization signal 23b. The document size determination unit 30 outputs the determination result 30a of the document 20 to the document edge detection unit 31 and the frame size selection unit 35.

When receiving the determination result 30a indicating that the size of the document 20 is an irregular size from the document size determination unit 30, the document edge detection unit 31 monitors the rear edge of the document 20, that is, the trailing end of the page synchronization signal 23b from the document detection unit 23. When detecting the trailing end of the page synchronization signal 23b, the document edge detection unit 31 transmits a detection signal 31a of the trailing end of the page synchronization signal 23b to the frame size selection unit 35.

The frame buffer 32 stores the image data of one page output from the reading unit 24 as bitmap data. As the storing operation of the image data is terminated, the frame buffer 32 transmits the bitmap data stored therein to the serialization unit 37.

The frame size setting unit 33 sets a frame size that can be used in the serial communication path 4 in the size buffer 34 based on a user's manipulation entering to the manipulation display 12.

The size buffer 34 has plural buffers 34a to 34d. The buffers 34a to 34d store frame sizes $V_0$, $V_1$, $V_2$, and $V_3$, respectively, set by the frame size setting unit 33.

When the document size determination unit 30 determines that the document 20 has an irregular size, and a non-transmission portion (a portion which has not yet been transmitted) of the image data exists when the rear edge of the document 20 is detected by the document edge detection unit 31, the frame size selection unit 35 selects, from the size buffer 34, one of the second frame sizes $V_1$, $V_2$ and $V_3$, with which transmission of the non-transmission portion is finished within a time (hereinafter, referred to as a "limited time") until a start of transmission of the image data corresponding to the next document 20 after the frame of the first frame size $V_0$ is finally transmitted.

The frame size selection unit 35 selects the second frame size having a larger size with a higher priority out of the two or more second frame sizes $V_1$ to $V_3$.

When the sizes other than the second frame size $V_3$ having the minimum value out of the two or more second frame sizes $V_1$ to $V_3$ cannot be transmitted within the limited time, the frame size selection unit 35 calculates a repetition transmission count (a number of repetitions of the transmission) in the frame of the second frame size $V_3$ having the minimum value required for transmitting the non-transmission portion and controls the frame generation unit 36 to generate a frame of the second frame size having the minimum value as much as the calculated transmission count.

The frame generation unit 36 generates a frame having the frame size selected by the frame size selection unit 35.

The serialization unit 37 inserts the image data 32a output from the frame buffer 32 into the payload of the frame generated by the frame generation unit 36, converts the frame into serial data, and transmits the serial data to the controller 5 through the serial communication path 4.

(Frame Structure)

Figure 3:
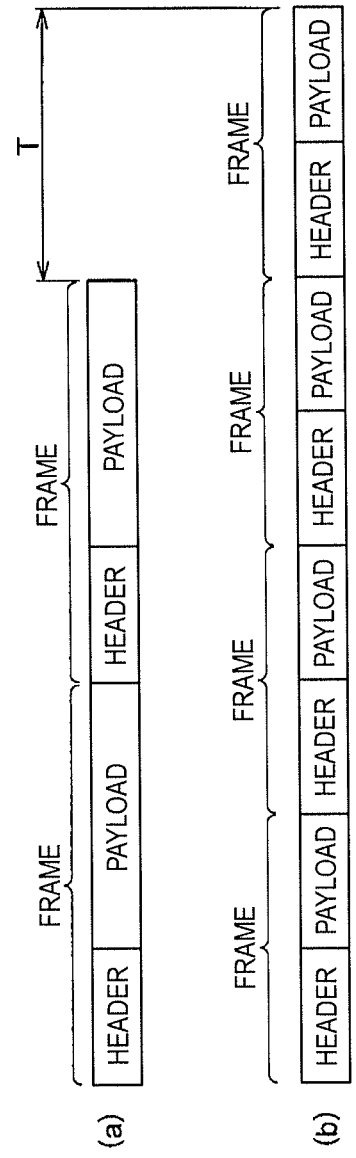
FIG. 3 is a diagram illustrating a frame structure, in which (a) is a case wherein the image data are transmitted in two frames, and (b) is a case wherein the image data having the same data amount as that of (a) are transmitted in four frames.

FIG. 3 is a diagram illustrating a frame structure, in which (a) is a case wherein the image data are transmitted in two frames, and (b) is a case wherein the image data having the same amount of data as that of (a) are transmitted in four frames. The frame includes a header in which a transmission destination, a data amount, and the like are recorded and a payload that contains the image data. Here, the header is an instance of an overhead. If the transmission count increases from "two" illustrated in (a) of FIG. 3 to "four" illustrated in (b) of FIG. 3, more time T is necessary to transmit the image data of the transmission count of "4" compared to the time for transmitting image data of the transmission count of "2" as much as the two headers. Therefore, the frame size selection unit 35 selects a relatively larger frame size with a higher priority to reduce the transmission count in the transmission of the non-transmission portion (the portion which has not yet been transmitted) of the image data within a limited time.

(Instance of Method of Selecting Frame Size)

FIG. 4 is a diagram illustrating an instance of a timing chart at the time of transmitting the final frame. A gap time Tg, which is a time between the end of the reading of the document 20 and the start of the reading of the next document 20, is generated between the page synchronization signal 23b and the next page synchronization signal 23b. When the size of the document 20 is an irregular size, after image data $D_2$ of image data $D_1$ of the document 20 is transmitted in the final frame of the first frame size $V_0$, image data $D_3$ may be generated as a non-transmission portion (a portion which has not yet been transmitted).

A frame size required to transmit the image data $D_3$ of the non-transmission portion is defined as Va (any size), and a time (transmission time) required to transmit the image data $D_3$ of the non-transmission portion in the frame size Va is defined as Ta. When a limited time until the start of the next page synchronization signal 23b after the transmission of the image data $D_2$ in the first frame size $V_0$ is defined as $T_L$, the following relation is satisfied: $T_L$=Ta+Tg.

When the image data $D_3$ of the non-transmission portion is transmitted in the first frame size $V_0$ or the second frame size $V_1$, since the transmission time of the image data $D_3$ of the non-transmission portion exceeds the limited time $T_L$ as illustrated in FIG. 4, the transmission is not finished before the start of the next page synchronization signal 23b. In a case illustrated in FIG. 4, the frame size selection unit 35 preferentially select the second frame size $V_2$ capable of being transmitted in a single time, and selects the second frame size $V_3$ having the minimum value and transmits the selected second frame size $V_3$ several times (two times in FIG. 4) when the second frame size $V_2$ cannot be transmitted within the limited time $T_L$.

(Operation of Information Processing Apparatus)

Next, an instance of the operation of the information processing apparatus 1 will be described. A user sets plural documents 20 on the tray 21 of the image input unit 2 in a stack state and instructs reading of the documents 20 by manipulating the manipulation display 12. The following description will be mainly made with respect to a case where the documents 20 have an irregular size.

The automatic sheet feeding device 22 of the image input unit 2 starts automatic feeding of the documents 20. As the document 20 is detected, the document sensor of the document detection unit 23 transmits the document detection signal 23a to the document size determination unit 30 of the transmission controller 3. The edge sensor of the document detection unit 23 transmits the page synchronization signal 23b to the document detection unit 23 and a document edge detection unit 31 of the transmission controller 3 from detection of the leading edge of the document 20 to detection of the trailing end of the document 20.

The document size determination unit 30 determines the size of the document 20 based on the document detection signal 23a and the page synchronization signal 23b from the document detection unit 23 and determines whether the document 20 has a regular or irregular size. Then, the determination result 30a is output to the document edge detection unit 31 and the frame size selection unit 35.

When it is determined that the document 20 has a regular size, the frame size selection unit 35 selects the second frame size $V_1$ to $V_3$ corresponding the regular size from the size buffer 34, whereas when it is determined that the document 20 has an irregular size, the frame size selection unit 35 is operated as illustrated in the flowchart of FIG. 5.

FIG. 5 is a flowchart illustrating an exemplary operation of the transmission controller 3 when the document 20 has an irregular size.

When the determination result 30a of the document size determination unit 30 is an irregular size, the transmission controller 3 transmits the image data 24a output from the image input unit 2 to the frame of the first frame size $V_0$ (S1).

That is, the frame size selection unit 35 selects the first frame size $V_0$ from the size buffer 34 based on the determination result 30a of an irregular size as determined by the document size determination unit 30, and outputs the selected result to the frame generation unit 36. The frame generation unit 36 generates the frame of the first frame size $V_0$ including header 61, and outputs the generated frame to the serialization unit 37. The serialization unit 37 inserts the image data 32a output from the frame buffer 32 into a payload of the frame generated by the frame generation unit 36, converts the frame 60 into serial data, and transmits the serial data to the controller 5 through the serial communication path 4.

When the determination result 30a of an irregular size is output from the document size determination unit 30, the document edge detection unit 31 monitors a trailing end of the page synchronization signal 23b from the document detection unit 23. The document edge detection unit 31 transmits the detection signal 31a to the frame size selection unit 35 (S1) when detecting the trailing end of the page synchronization signal 23b (S2: Yes).

The frame size selection unit 35 determines whether a non-transmission portion (a portion which has not yet been transmitted) is present based on the detection signal 31a and the first frame size $V_0$ (S3). When the non-transmission portion is not present (S3: No), the transmission process ends.

When the non-transmission portion is present (S3: Yes), the frame size selection unit 35 obtains a transmission time Ta of the frame of the second frame size $V_1$ for transmitting the non-transmission portion from a data amount of the non-transmission portion, and determines whether to satisfy a condition of Ta<$T_L$ (S4).

In the case of satisfying the condition of Ta<$T_L$ (S4: Yes), the transmission controller 3 the frame of the second frame size $V_1$ as a final frame in the same manner as described in step S1 (S6).

In the case of not satisfying the condition of Ta<$T_L$ (S4: No), the frame size selection unit 35 reduces the current frame size by one (S6), and determines whether the frame size reduced by one is a minimum frame size (S7). The frame size selection unit 35 repeats the processes of step S4, S6, and S7 until the condition of Ta<$T_L$ is satisfied.

In step S7, when the frame size selected by the frame size selection unit 35 is the minimum frame size (S7: Yes), the frame size selection unit 35 calculates a repetition transmission count (a number of repetitions of the transmission) by the minimum frame size (S8). The frame generation unit 36 generates the frame of the minimum frame size $V_3$ of the calculated transmission count as final frame(s), and the serialization unit 37 transmits the frame(s) generated by the frame generation unit 36 (S9). FIG. 4 illustrates an instance in which the frame of the minimum frame size $V_3$ is transmitted two times.

While exemplary embodiments of the invention have been described hereinbefore, they are not intended to limit the scope of the invention. Various changes or medications may be possible without departing from the spirit and scope of the invention. Any step of the flow described in the exemplary embodiments may be added, deleted, changed, or substituted without departing from the spirit and scope of the invention.

What is claimed is:

1. An information processing apparatus for transmitting image data input by sequentially reading documents, with limiting an allowable frame size, the apparatus comprising:
   a transmission controller,
   wherein, in a case where the document has an irregular size, the transmission controller transmits the image data to a transmission destination in a preset frame of a first frame size until a rear edge of the document is detected, and if a portion, which is not transmitted, of the image data exists when the rear edge of the document is detected, transmits the portion to the transmission destination in a frame of a second frame size smaller than the first frame size so that the transmitting of the portion is finished before a start of transmission of image data corresponding to a next document.

2. The information processing apparatus according to claim 1,
   wherein the transmission controller comprises:
   at least one integrated circuit configured to function as:
      a document size determination unit that determines whether the document has a regular size or an irregular size; and
      a document edge detection unit that detects the rear edge of the document in a case where the document size determination unit determines that the document has an irregular size;
   a memory that stores the first frame size and two or more of the second frame sizes; and
   the at least one integrated circuit further configured to function as:
      a frame size selection unit that selects, from the memory, one of the second frame sizes with which the transmitting of the portion is finished within a time until a start of transmission of the image data corresponding to the next document after the frame of the first frame size is finally transmitted, in a case where the document size determination unit determines that the document has an irregular size, and the portion, which is not transmitted, of the image data exists when the rear edge of the document is detected by the document edge detection unit;
      a frame generation unit that generates a frame of the first frame size or of the second frame size selected by the frame size selection unit; and
      a serialization unit that converts the frame generated by the frame generation unit into serial data and transmits the serial data to the transmission destination through a serial interface.

3. The information processing apparatus according to claim 2, wherein the frame size selection unit preferentially selects a larger second frame size out of the two or more second frame sizes.

4. The information processing apparatus according to claim 3, wherein, in a case where the frame sizes other than the second frame size having a minimum value out of the two or more second frame sizes cannot be transmitted within the time, the frame size selection unit calculates a number of repetitions of the transmission in the frame of the second frame size having the minimum value for transmitting the portion and controls the frame generation unit to generate the number of the frames of the second frame size having the minimum value.

5. The information processing apparatus according to claim 1,
   wherein the frame includes a header in which at least a transmission destination is recorded and a payload that contains the image data.

6. The information processing apparatus according to claim 1,
   wherein a number of allowable frame size is limited to a plurality of frame sizes prepared in advance.

7. The information processing apparatus according to claim 1,
   wherein the transmission controller comprises:
   at least one integrated circuit configured to function as:
      a document edge detection unit that detects the rear edge of the document in a case where the document size determination unit determines that the document has an irregular size;
   a memory that stores the first frame size and two or more of the second frame sizes; and
   the at least one integrated circuit further configured to function as:
      a frame size selection unit that selects, from the memory, one of the second frame sizes with which the transmitting of the portion is finished within a time until a start of transmission of the image data corresponding to the next document after the frame of the first frame size is finally transmitted, in a case where the document size determination unit determines that the document has an irregular size, and the portion, which is not transmitted, of the image data exists when the rear edge of the document is detected by the document edge detection unit.

* * * * *